United States Patent [19]

Yamaguchi

[11] Patent Number: 5,448,655
[45] Date of Patent: Sep. 5, 1995

[54] IMAGE DATA PROCESSOR AND IMAGE DATA PROCESSING METHOD

[75] Inventor: Katsuya Yamaguchi, Kamikyo, Japan

[73] Assignee: Dainippon Screen Mfg. Co., Ltd., Kyoto, Japan

[21] Appl. No.: 58,057

[22] Filed: May 7, 1993

[30] Foreign Application Priority Data

May 26, 1992 [JP] Japan .................. 4-160392

[51] Int. Cl.⁶ .............................. G06K 9/60
[52] U.S. Cl. .................... 382/304; 382/193; 382/234; 395/650
[58] Field of Search ............ 382/41, 49, 1, 22; 395/163, 165, 650

[56] References Cited

U.S. PATENT DOCUMENTS

| 4,800,521 | 1/1989 | Carter et al. | 395/650 |
| 4,839,798 | 6/1989 | Eguchi et al. | 395/650 |
| 4,850,027 | 7/1989 | Kimmel | 382/49 |
| 4,945,470 | 7/1990 | Takahashi | 395/650 |
| 5,010,515 | 4/1991 | Torborg, Jr. | 395/163 |
| 5,179,637 | 1/1993 | Nardozzi | 395/163 |
| 5,179,715 | 1/1993 | Andoh et al. | 395/650 |

FOREIGN PATENT DOCUMENTS

| 0329151A2 | 8/1989 | European Pat. Off. . |
| 0478338A2 | 4/1992 | European Pat. Off. . |
| 0172064 | 9/1984 | Japan . |
| 60-159973 | 8/1985 | Japan . |
| 61-151775 | 10/1986 | Japan . |
| 62-166471 | 7/1987 | Japan . |

OTHER PUBLICATIONS

Proceedings of SPIE, Extracting Meaning from Complex Data: Processing, Display, Interaction, vol. 1259, Feb. 1990, USA pp. 39–49, "Three-dimensional data visualization using DSP meshes," Yuh-Tay Liow et al.

Soo-Young Lee et al. "A System Design/Scheduling Strategy for Parallel Image Processing" Feb. 1990 pp. 194–204.

Ken Luo et al., "Near-Optical Heuristics for Schedulings on Task-Dependent Machines" 1992, pp. 842–847.

Primary Examiner—Leo H. Boudreau
Assistant Examiner—Christopher S. Kelley
Attorney, Agent, or Firm—Lowe, Price, LeBlanc & Becker

[57] ABSTRACT

An image data processor including a plurality of unit processors and processes a block of image data using the unit processors in parallel. Allotment ratios corresponding to the unit processors are stored in an allotment memory, and each of the unit processors processes its allotment of the block of image data according to its allotment ratio, whereby the lengths of time needed to process the allotments are equalized. The allotment ratios can be updated from time to time regarding the actual results of the processing time of the unit processors, or regarding the content of the image (which can be detected by sampling a part of the image data) and the type of data processing.

4 Claims, 5 Drawing Sheets $a+b+c=1$

IMAGE DATA PROCESSOR AND IMAGE DATA PROCESSING METHOD

The present invention relates to an image data processor and image data processing method which includes a plurality of unit processors and divides a block of image data into allotments to process the image data in parallel.

BACKGROUND OF THE INVENTION

Since the amount of data of an image is generally very large, it takes a long time if the image data is processed sequentially. Thus, a parallel data processing is devised for decreasing the data processing time, in which a plurality of unit processors are provided, a block of data of an image is divided equally and allotted to the unit processors, and the allotments are processed in parallel by the unit processors.

If, however, the hardware constructions of the plural unit processors are diverse, their data processing abilities are also diverse. And there is a case in which one or some of the unit processors are assigned other jobs than the parallel data processing job. Further, since an image is hardly uniform in its complexity, the time needed to process data of an image differs from part to part of the image. Therefore, the lengths of processing time of plural unit processors are usually different from one another, and it often occurs that one or some of the unit processors are still working while others have finished the assigned job if the image data is divided equally. In this case, the parallel data processing is not really efficient, because, if the whole of the image data is the object of the next data processing step, the next data processing step must wait until the last of the unit processors finishes its allotment.

Japanese laid-open (unexamined) patent application No. S62-166471 discloses an improved parallel data processing method in which an image is divided into many narrow linear areas, and every unit processor sequentially takes up another narrow area when it finishes processing an area. By this method, the processing time is averaged among the unit processors and the overall efficiency is improved.

There is a drawback in the method, and sometimes the efficiency is deteriorated. When the type of image data processing is such that processing of a part requires reference to the processing of another part (e.g., line-thickening or shading), the narrow division increases the chance of inter-part references and multiple-part references. These cross references between the plural unit processors increase the complexity of the data processing and elongate the processing time substantially.

SUMMARY OF THE INVENTION

The present invention addresses the problem of parallel data processing of an image and provides a simple image data processing apparatus and method which use a plurality of unit processors in parallel which can process image data with high efficiency.

According to the present invention, an image data processor includes:
- an image memory for storing data of an image;
- an allotment memory for storing data of allotment ratios; and
- a plurality of unit processors each for performing the same data processing in parallel with the other unit processors on an allotment of the image data, the allotment being determined by the allotment ratio.

The image data processor may further include first updating section and/or second updating section. The first updating section measures lengths of time needed for the unit processors to perform the data processing, and updates the allotment ratios according to the measured lengths of time to equalize the lengths of time of all the unit processors. The second updating section samples a part of the image data, and updates the allotment ratios according to the content of the sampled data and type of the data processing to equalize the lengths of time of all the unit processors.

An image data processing method according to the present invention includes the following steps, where data of an image stored in an image data memory are processed using a plurality of unit processors:
- determining allotment ratios of the unit processors for equalizing lengths of time needed for the unit processors to perform the image data processing;
- calculating a starting address of the image data memory for each of the unit processors according to the allotment ratios; and
- reading out data, at each of the unit processors, from the image data memory from the starting address corresponding the unit processor and processing data in parallel with the other unit processors.

Details of the present invention is described with other features of the present invention in the following description of preferred embodiments.

DETAILED DESCRIPTION OF PREFERRED EMBODIMENTS

Figure 1:
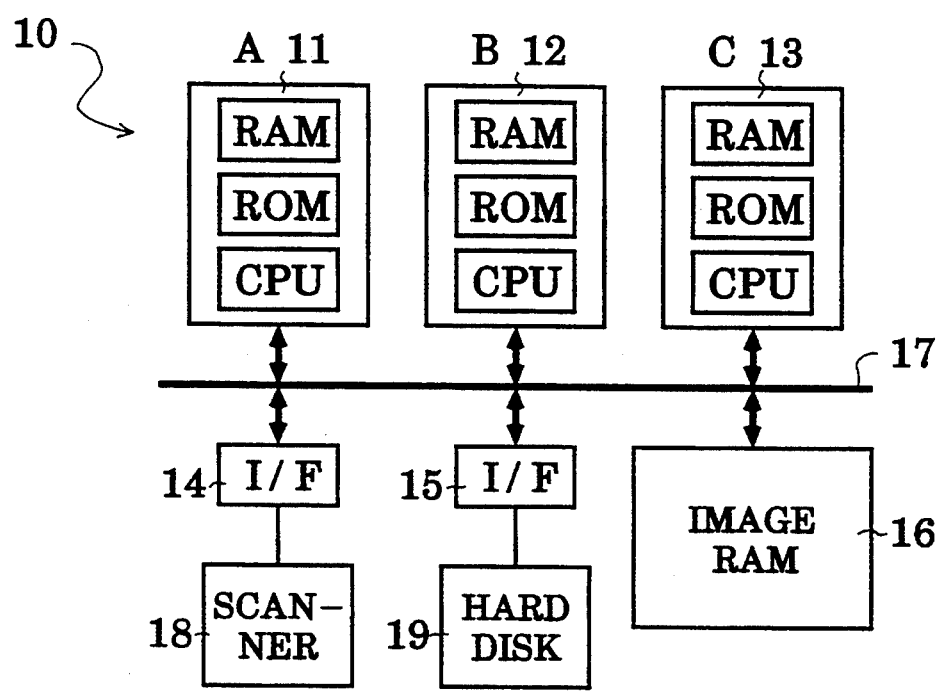
FIG. 1 is a block diagram of an image data processor embodying the present invention.

The first embodiment of the present invention is described referring to FIGS. 1 to 4. As shown in FIG. 1, the image data processor 10 of the present embodiment includes an image RAM 16, three unit processors A11, B12 and C13 for processing in parallel the data in the image RAM 16, and a bus line 17 connecting those elements. The data processor 10 is further connected to an input scanner 18 and an external memory device (hard disk) 19 via respective interfaces (I/F) 14 and 15.

Figure 4:
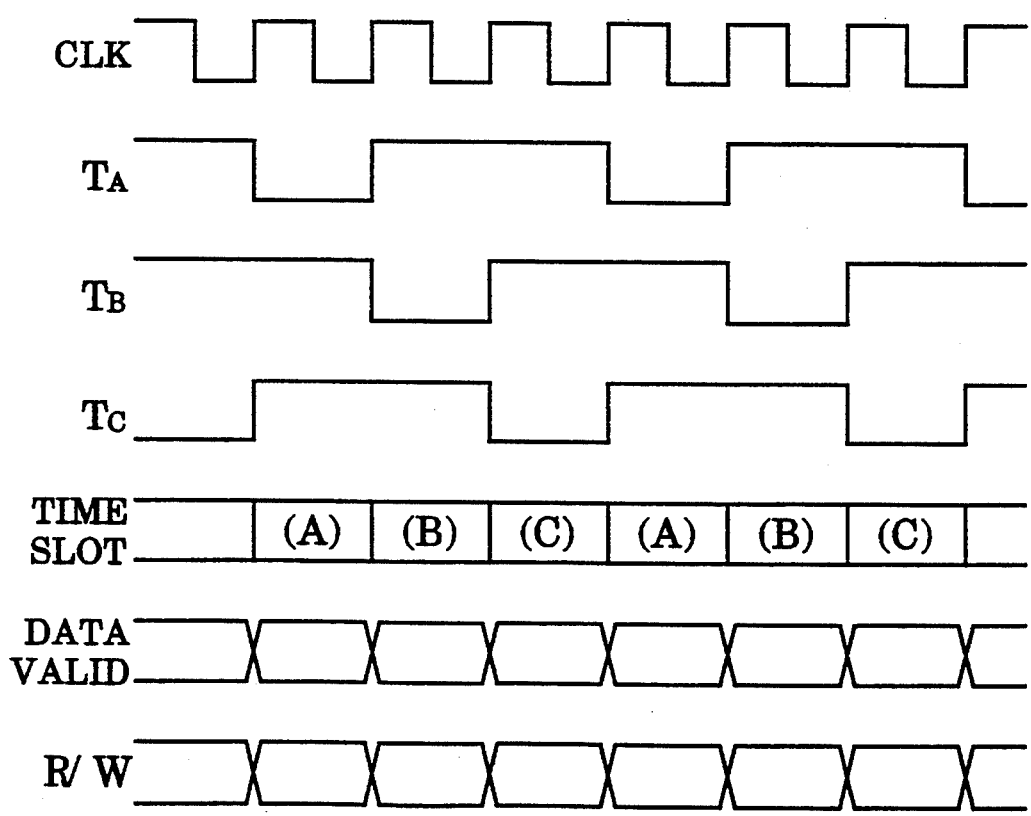
FIG. 4 is a timing chart of various signals for controlling the traffic of image data in the bus line of the image data processor of the embodiment.

Every unit processor A11, B12 or C13 includes a CPU, ROM and RAM, and reads out image data from the image RAM 16, processes the image data according to a preset program and writes back the processed image data into another area (or overwrites on the same area in some cases) of the image RAM 16. Traffic of the image data between the unit processors A11, B12 and C13 and the image RAM 16 in the bus line 17 is controlled by, as shown in FIG. 4: a clock signal CLK; time slot allotting signals $T_A$, $T_B$ and $T_C$ respectively corresponding to the unit processors A11, B12 and C13; a data valid signal; and a read/write (R/W) signal. The time slot allotting signals $T_A$, $T_B$ and $T_C$ change their state at every predetermined cycles of the clock signal CLK and give a bus appropriation right to the three unit processors A11, B12 and C13 cyclically. Every unit processor A11, B12 or C13 reads image data from the image RAM 16 or writes processed image data to the image RAM 16 according to the state of the R/W signal within the allotted time slot. The image RAM 16 receives data from the bus line 17 when the data valid signal indicates that the data on the bus line 17 is valid.

Since, in the image data processor 10 of the present embodiment, the unit processors A11, B12 and C13 have the same CPU and the same hardware construction, the data processing abilities of the unit processors A11, B12 and C13 are the same. But one of the unit processors (A11) is special in the present embodiment because it is assigned additional jobs (control of the input scanner 18 and the hard disk 19, and an adjustment among all jobs of the image data processor 10) besides the job of the parallel image data processing assigned to the unit processor A11 as well as to the other two unit processors B12 and C13. The unit processor A11 performs such additional jobs for 0.05 seconds at every 0.1 seconds, which means that the unit processor A11 has a heavier burden than the other two unit processors B12 and C13, and the image data processing efficiency of the unit processor A11 is half of the other unit processors B12 or C13.

Figures 2, 3:
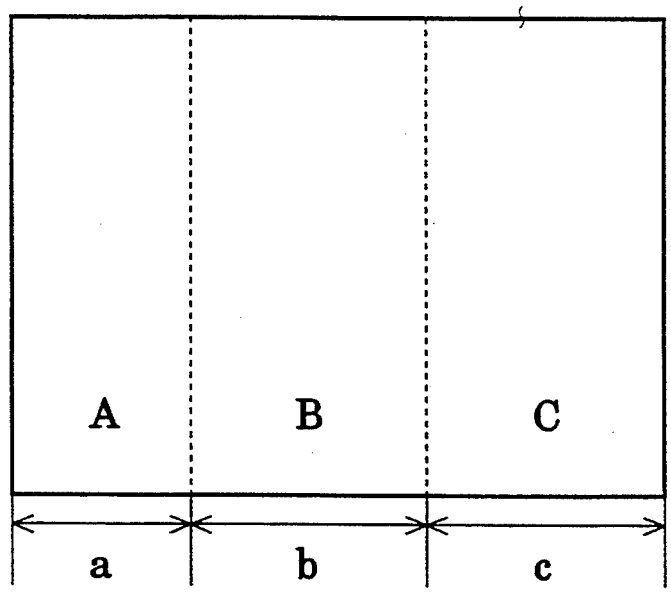
FIG. 2 is a diagram showing a division of a block of image data.
FIG. 3 is a diagram showing an allotment data memory.

Therefore, in the image data processor 10 of the present embodiment, as shown in FIG. 2, a block of data 21 corresponding to an image is divided not equally but with different allotment ratios a, b and c (here, a+b+c=1) which are predetermined regarding the burdens of the unit processors A11, B12 and C13. In the present embodiment, the allotment ratio (a) of the unit processor A11 is half of the other two allotment ratios (b and c) of the other two unit processors B12 and C13 (i.e., a=0.2, b=0.4 and c=0.4). The data 22 of the allotment ratios a, b and c are stored in an allotment data memory area of a RAM provided in every unit processor A11, B12 or C13, as shown in FIG. 3.

When a parallel image data processing is assigned, every unit processor A11, B12 or C13 reads out the data 22 of the allotment ratio from its RAM, and calculates the read-starting address (the first address to read out data) of the image RAM 16 according to the following formulae.

In the unit processor A11, [read-starting address]=-[first address of the data block 21]

In the unit processor B12, [read-starting address]=-[first address of the data block 21]+[amount of the data block 21]·[allotment ratio a]

In the unit processor C13, [read-starting address]=-[first address of the data block 21]+[amount of the data block 21]·[allotment ratio a +allotment ratio b]

The three unit processors A11, B12 and C13 start parallel processing of the image data at the same time. Provided the size of the block of the image data 21 is 10000 pixels in the x axis and 10000 pixels in the y axis, the unit processor A11 starts reading data from the first address of the area of the image RAM 16 storing the data block 21, and finishes data reading at the 2000th pixel line in the x direction. The unit processor B12 processes data from the 2001st pixel line to the 6000th pixel line, and the unit processor C13 from the 6001st pixel line to the last (10000th) pixel line. Since the allotment ratios a, b and c are determined regarding the burdens of the respective unit processors A11, B12 and C13, their processing times are equalized and they finish respective image data processing almost at the same time, whereby the efficiency of the entire image data processor 10 is enhanced.

In the above description, respective unit processors A11, B12 and C13 store the allotment data 22 and calculate the read-starting address. It is possible instead, as shown in FIG. 5, to provide another independent CPU 42 for controlling the image data processor 20 as a whole and a common RAM 41 for storing the allotment data 22 besides those provided in the respective unit processors A11, B12 and C13.

In the first embodiment described above, the hardware constructions (and thus the data processing abilities) of the three unit processors are the same but the assigned burdens are diverse. When, on the contrary, the assigned burdens are the same but the abilities of the hardware are diverse, the allotment data 22 can be predetermined similarly and stored in the RAM (of the respective unit processor A11, B12 and C13, or in the common RAM 41). For example, when an initially used unit processor A11 using a 16-bit CPU is joined by two unit processors B12 and C13 each using a 32-bit CPU to perform parallel processing, the allotment ratio of the less efficient unit processor A11 is set smaller than those of the new more efficient unit processors B12 and C13, whereby the processing time of the unit processors A11, B12 and C13 are equalized.

When the processing abilities (or burdens) of the unit processors A11, B12 and C13 are unchanged, the image data processor of the above embodiment functions properly. But when the burden of the jobs other than the parallel data processing job (e.g., the control of the input scanner 18 in the above example) changes while the unit processor A11 is processing the allotted data of the parallel processing, the finishing time of the unit processors deviates. In this case, it is possible to update the allotment ratio from time to time according to the actual result of the processing time of the unit processors. Such updating operation of the allotment ratio can be done by any of the unit processors A11, B12 or C13 in case of FIG. 1 or by the independent CPU 42 in case of FIG. 5. The second embodiment of the present invention is an image data processor which updates the allotment ratio during a parallel data processing.

Figure 5:
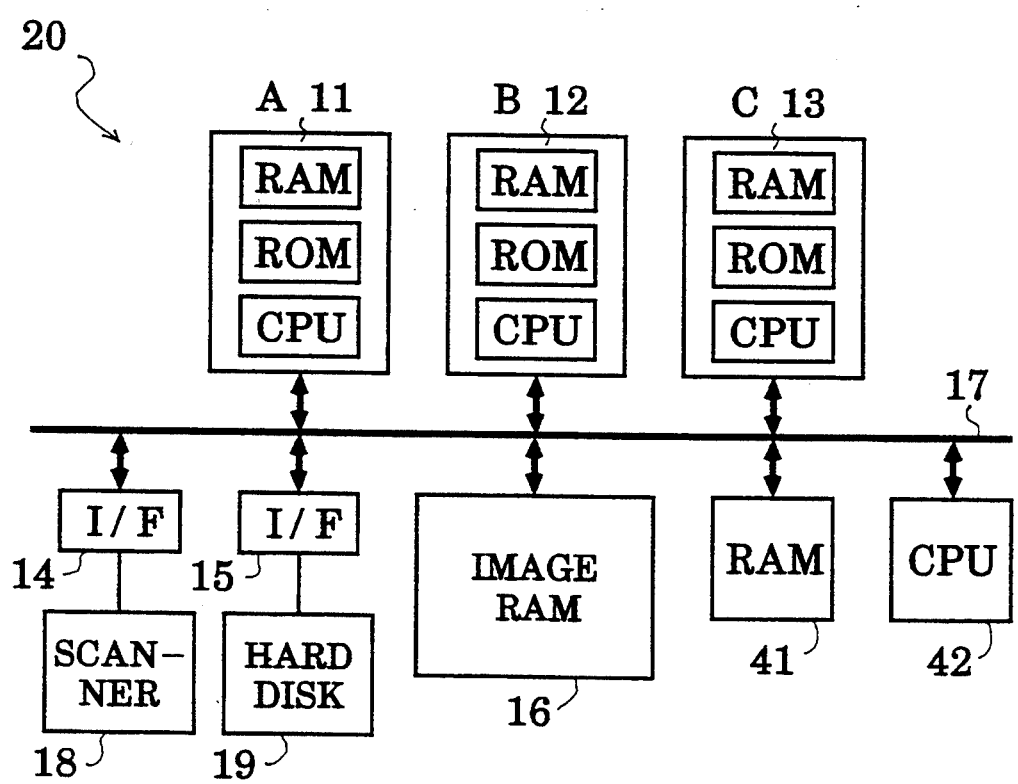
FIG. 5 is a block diagram of another image data processor embodying the present invention.

An initial allotment ratios $a_0$, $b_0$ and $c_0$ for the unit processors A11, B12 and C13 are tentatively determined regarding the hardware capabilities and known burdens of the unit processors A11, B12 and C13, and the initial allotment ratios $a_0$, $b_0$ and $c_0$ are stored in a RAM (in the RAM of the unit processor A11 for example in case of FIG. 1 or in the common 41 RAM in case of FIG. 5). First, a parallel data processing is performed using the initial allotment ratios $a_0$, $b_0$ and $c_0$, and the lengths of the processing time $T_{A1}$, $T_{B1}$ and $T_{C1}$ of the unit processors A11, B12 and C13 are measured by a CPU (the CPU of the unit processor A11 for example in case of FIG. 1 or the independent CPU 42 in case of FIG. 5). Regarding the measured lengths of the processing time $T_{A1}$, $T_{B1}$ and $T_{C1}$ of the unit processors A11, B12 and C13, the CPU updates the initial allotment ratios $a_0$, $b_0$ and $c_0$ to new allotment ratios $a_1$, $b_1$ and $c_1$ using the following formulae.

$$a_1 = (a_0/T_{A1})/(a_0/T_{A1} + b_0/T_{B1} + c_0/T_{C1})$$

$$b_1 = (b_0/T_{B1})/(a_0/T_{A1} + b_0/T_{B1} + c_0/T_{C1})$$

$c_1 = (c_0/T_{C1})/(a_0/T_{A1} + b_0/T_{B1} + c_0/T_{C1})$

The CPU stores the new allotment ratios $a_1$, $b_1$ and $c_1$ in the RAM. In the next round of parallel data processing, the unit processors A11, B12 and C13 determine their allotment of image data (i.e., calculate the read-starting addresses) using the new allotment ratios $a_1$, $b_1$ and $c_1$ stored in the RAM, and processes the allotted data. After the round of parallel data processing is finished, the CPU measures the lengths of processing time of the unit processors A11, B12 and C13 again and updates the allotment ratios $a_1$, $b_1$ and $c_1$ to second-new allotment ratios $a_2$, $b_2$ and $c_2$. Thus the allotment ratios $a_i$, $b_i$ and $c_i$ are repeatedly updated regarding the actual result (processing time) of the previous round of parallel data processing, whereby the lengths of processing time of the unit processors A11, B12 and C13 are gradually equalized.

There is a case where the processing time changes according to the content of the image data. When, for example, contour emphasizing or thickening (e.g., thickening the areas of a specific color) is required for a block of image data, the image data processing time is short in the area not including a contour or area of the color, but long processing time is required in the area including a long contour or including a long boundary of such area. The third embodiment of the present invention is an image data processor that changes the allotment ratios according to the content of the image data to be processed.

Figure 6A:
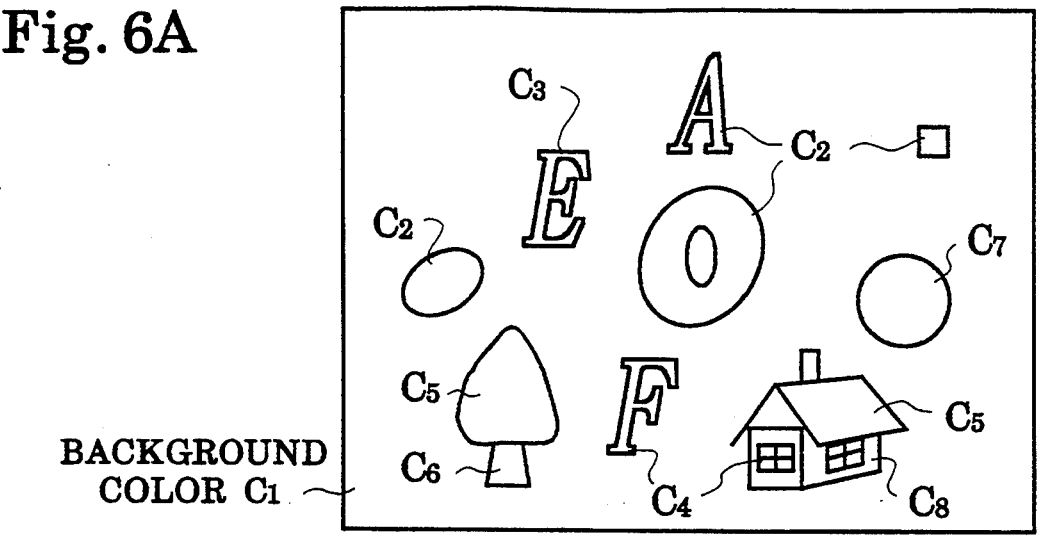
FIG. 6A is a sample image.
Figure 6B:
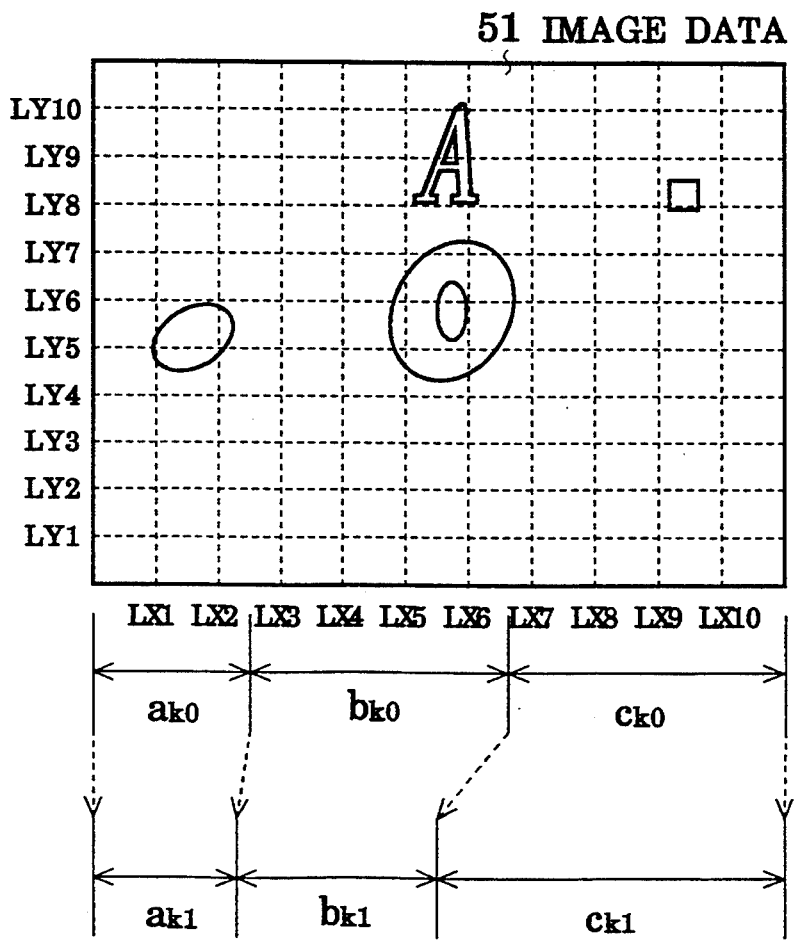
FIG. 6B shows a data sampling and an allotment plan on the sample image.

An image as shown in FIG. 6A is given in which distinct areas are variously colored (in colors $C_1$-$C_8$), and the areas of color $C_2$ are required thickening in this case. Three unit processors A11, B12 and C13 of the image data processor 10 in FIG. 1 or those of the image data processor 20 in FIG. 5 perform the thickening processing in parallel as follows. First the content of the image is reviewed briefly. That is, as shown in FIG. 6B, the image data 51 are sampled on the ten x-directional lines LX1–LX10 and on the ten y-directional lines LY1–LY10 which are evenly dispersed in the block of the image data, and detects such data that are located on the boundary between the areas of color $C_2$ and the other areas. The number of such data is stored in the RAM (in the RAM of the unit processor A11 in FIG. 1 or in the independent RAM 41). The time needed for the data sampling and the boundary detection is far shorter than the time needed to process the whole image data.

After detecting the boundary data on the sampling lines LX1–LX10 and LY1–LY10, the number of the boundary data is counted for each of the divisions of the data block 51 allotted to the unit processors A11, B12 and C13 according to the current allotment ratios $a_{k0}$, $b_{k0}$ and $c_{k0}$ ($a_{k0}+b_{k0}+c_{k0}=1$) (as shown in FIG. 6B). Provided the counted numbers are $k_a$, $k_b$ and $k_c$ for the three allotments, the CPU updates the current allotment ratios $a_{k0}$, $b_{k0}$ and $c_{k0}$ to new ratios $a_{k1}$, $b_{k1}$ and $c_{k1}$ using the following formulae.

$$a_{k1} = \{a_{k0} - j \cdot k_a/(k_a + k_b + k_c)\}/e$$
$$= e_a/e$$

$$b_{k1} = \{b_{k0} - j \cdot k_b/(k_a + k_b + k_c)\}/e$$
$$= e_b/e$$

-continued $$c_{k1} = \{c_{k0} - j \cdot k_c/(k_a + k_b + k_c)\}/e$$
$$= e_c/e$$

where $e_a + e_b + e_c = e$, or $$a_{k1} = e_a/(e_a + e_b + e_c)$$
$$b_{k1} = e_b/(e_a + e_b + e_c)$$
$$c_{k1} = e_c/(e_a + e_b + e_c)$$

In the above formulae, j is a parameter that determines how much the allotment ratios should be changed according to the content of the image data 51. The value of the parameter j is preferably about 0.2. Incorporating such an updating system according to the content of the image data 51 in addition to the updating system as described in the above first and second embodiments, the processing time of the unit processors A11, B12 and C13 are further equalized.

In the above embodiment, the data at the boundary of areas at which the colors change are counted because the thickening is the object of the data processing. If the object of the data processing is to change the color of certain areas, the data in such areas are counted. That is, the data to be counted depends on the type of image data processing. The data sampling method (sampling on the lines LX1–LX10 and LY1–LY10 in the above embodiment) can be otherwise. It is possible to sample data from the points uniformly dispersed in the image.

What is claimed is:

1. An image data processor comprising:
    an image memory for storing data of an image;
    an allotment of memory for storing data of allotment ratios;
    a plurality of unit processors each for performing the same data processing in parallel with the other unit processors on an allotment of the image data, the allotment being determined by the allotment ratio;
    first updating means for measuring length of time needed for the unit processors to perform the data processing and for updating the allotment ratios according to the measured lengths of time to equalize the processing time of all the unit processors; and
    second updating means for sampling a part of the image data and for updating the allotment ratios according to the content of the sampled data and type of the data processing to equalize the processing time of all the unit processors; wherein
    said second updating means detects boundaries of images in the sample data, counts the number of boundaries in the sample data, and updates the allotment ratios according to the number of boundaries counted in the sample data.

2. An image data processor comprising:
    an image memory for storing data of an image;
    an allotment of memory for storing data of allotment ratios;
    a plurality of unit processors each for performing the same data processing in parallel with the other unit processors on an allotment of the image data, the allotment being determined by the allotment ratio; and
    updating means for sampling a part of the image data and for updating the allotment ratios according to the content of the sampled data and type of the data processing to equalize the processing time of all the unit processors, wherein said updating means detects boundaries of images in the sample data, counts the number of boundaries in the sample data, and updates the allotment ratios according to the number of boundaries counted in the sample data.

3. A method of processing data of an image stored in an image data memory using a plurality of unit processors., the method comprising the steps of:

determining allotment ration of the unit processors for equalizing lengths of time needed for the unit processors to perform the image data processing;

calculating a starting address of the image data memory for each of the unit processors according to allotment rations;

reading out the data, at each of the unit processors, from the image data memory from the starting address corresponding to the unit processor and processing data in parallel with the other unit processors;

measuring the lengths of time needed for the unit processors to perform the data processing; and updating the allotment ratios according to the measured lengths of time to equalize the lengths of time of all of the unit processors; wherein said updating step further comprises the steps of:

detecting boundaries of images in the sample data, counting the number of boundaries in the sample data, and updating the allotment ratios according to the number of boundaries counted in the sample data.

4. A method of processing data of an image stored in an image data memory using a plurality of unit processors, the method comprising the steps of:

determining allotment ratios of the unit processors for equalizing lengths of time needed for the unit processors to perform the image data processing;

calculating a starting address of the image data memory for each of the unit processors according to allotment ratios;

reading out the data, at each of the unit processors, from the image data memory from the starting address corresponding to the unit processor and processing data in parallel with the other unit processors;

sampling a part of the data stored in the image data memory; and updating the allotment ratios according to the content of the sampled data and type of the data processing to equalize the lengths of time of all of the unit processors; wherein said updating step further comprises the steps of:

detecting boundaries of images in the sample data, counting the number of boundaries in the sample data, and updating the allotment ratios according to the number of boundaries counted in the sample data.

* * * * *